United States Patent [19]

Koster

[11] Patent Number: 4,963,107

[45] Date of Patent: Oct. 16, 1990

[54] GRID MADE OF ELECTRICALLY CONDUCTING SHEET METAL

[75] Inventor: Walter Koster, Ganderkesee, Fed. Rep. of Germany

[73] Assignee: Schunk Motorensysteme GmbH, Ganderkesse, Fed. Rep. of Germany

[21] Appl. No.: 330,897

[22] Filed: Mar. 31, 1989

[30] Foreign Application Priority Data

Mar. 31, 1988 [DE] Fed. Rep. of Germany ....... 3810963

[51] Int. Cl.⁵ ............................................... H01R 9/24
[52] U.S. Cl. ...................................... 439/884; 29/874; 29/884; 439/516; 439/723
[58] Field of Search ............... 439/884, 885, 883, 874, 439/515, 516, 733, 796, 723; 29/874, 884

[56] References Cited

U.S. PATENT DOCUMENTS

| | | | |
|---|---|---|---|
| 2,996,794 | 8/1961 | Burdick | 29/874 |
| 3,467,941 | 9/1969 | Martin | 439/516 |
| 4,482,198 | 11/1984 | Crawley | 439/723 |
| 4,821,413 | 4/1989 | Schmitt et al. | 29/884 |

Primary Examiner—Paula A. Bradley
Attorney, Agent, or Firm—Dennison, Meserole, Pollack & Scheiner

[57] ABSTRACT

Suggested is a grid (22) of electrically conducting sheet material for connecting especially an electromotor, said grid being a deep-drawn part so that a high density and number of conductor paths (29) positioned side by side and one upon the other can be obtained, said conductor paths extending in different planes (24, 26, 28) and, if necessary, along curved paths.

11 Claims, 6 Drawing Sheets

GRID MADE OF ELECTRICALLY CONDUCTING SHEET METAL

DESCRIPTION

The invention relates essentially to a grid made of electrically conducting sheet metal for connecting especially an electromotor for e.g. an electric tool or a sash lifter, with areas forming conductor paths electrically separated from each other, which areas, if necessary, are extending in different planes.

The respective grids are cut out as sheet metal plates and undergo partly rather complicated bending operations. Produced in this manner, the shaping possibilities are restricted. Therefore such stamped grids are, on principle, plane-shaped and show bends in defined areas only. These, however, cannot extend on curved paths since, otherwise the base of the punched grid would be distorted. Then geometric conditions would not be well defined any longer.

Punched grids are used for current transmission over larger conductor sections, and in addition offer the chance of stamping plug-in connections at the same time as female and male plugs. Such grids are used e.g. in electric tools, as described for instance in the German patent application 35 38 939.

A respective plane or sheet-fabricated grid is composed of thin electric-conducting material with outer and inner strip conductors which are separated from each other after being mounted in a cup-shaped bearing bridge made of synthetic material. Hereby the punched grid not only serves to supply current to the carbon brushes of the electromotor but, in addition, to connect electric elements, like e.g. diodes, condensers or coils, in order to be able to suppress any eventual interferences, if necessary.

However, due to the quasi-two-dimensional structure of the punched grid, with the current paths running essentially in one plane only, limits are set with respect to the armament with electric elements and the design of flow filaments, especially since the plane-wise extension of the punched grids is extremely limited conditioned by their construction.

It is therefore the object of the present invention to design a grid of the above mentioned kind in such a manner as to provide an electric connecting to the desired extent with a lodging of e.g. radio shielding devices or other electric switchings, without requiring a larger plane-wise extension as compared to the known, in the main, plane punched grids. Likewise the chance shall be offered to provide conductor paths separated from each other on the most narrow space without necessitating a folding or bending. It shall also be possible to design curved paths extending in a different plane than the base plane of the grid.

This problem is solved essentially in such a manner that the grid is a deep-drawn part and preferably of an arch or cup or pot-shaped design. Due to the fact that the grid is a preferably multi-step deep-drawn part, conductor paths can run in the most narrow space on different planes and curved and arc-shaped. The advantages of the grid according to the invention are especially obvious with a pot or semi-circular construction. Such a geometry with a high density of conductor paths cannot be achieved with the conventional punched grids or at the greatest expense of bending techniques only, where, however, there must be considerably more free space must be available than with the deep-drawn grid.

With a semi-circular design one can obtain a channel-shaped structure, which with punched grids could be realized to a limited extent only, if at first the plane sheet material is cut in along the arched sector, whereby the channel like geometry without a formation of folds would be possible.

Especially the number of the conductor paths will be increased in an easy manner, and thus the armament facilities with e.g. diodes, coils, condensers, and/or transistors, by providing in the walls of the grid preferably several graded steps that can run parallelly to e.g. a base area defined by the bottom of the grid. Thereby the respective planes designed as plateaus can be electrically separated from the adjacent wall sections preferably extending diagonally.

Consequently by the teaching according to the invention, a three-dimensional grid is provided of a geometry almost arbitrarily defined by the kind of drawing stamp or stamps, whereby a high connection density obtained by an extremely inexpensive manufacturing method, is made available. The individual areas electrically separated from each other are located in the walls and planes of the preferably multi-step drawn grid, while the walls can extend curvedly without causing any dislocations or formation of folds in the base area.

In order to separate the individual areas, the deep-drawn grid is at first placed into a receptacle made of insulating material, or, resp. spray coated with a proper support material, in order to subsequently separate the areas of the drawn grid, preferably by cutting. To make this possible with simple means, the walls running diagonally to the base area show an angle of preferably 70 to 80°, especially of approx. 75° and that with respect to the base area.

The cross-section shape of such a grid can correspond to a single L or step form, or a U-form or a double or multiple U-form of a corrugated cardboard structure, in order to provide then by free cutting several electric conductor paths running side by side and/or one upon the other in different planes. In other words, the grid according to the invention presents a unit of several individual grids running side by side horizontally and vertically.

With the grids according to the invention one can bridge over considerable differences in height so that there are sufficient connection possibilities with electric and electronic elements.

By the manufacturing method of drawing and subsequent cutting, the conductor paths or current paths can be formed without bending or canting so that the disadvantages in this respect with the essentially plane two-dimensional punched grids are avoided.

In addition, according to the invention a method is suggested for producing a grid of electrically conducting sheet material for connecting an electromotor for e.g. an electric tool or sash lifter with areas defining conductor paths electrically separated from each other, which eventually are extending in different planes which method is excelling in that the sections of the sheet material are deep-drawn one after the other at least single-stage, but preferably two or three-stage, and subsequently are cut free areawise to obtain the conductor paths, where the sections are connected via at least one lateral area of the sheet material defining a marginal strip. Preferably the sections are connected via two marginal strips, by means of which the transport during the processing operation for the fabrication of the almost finished grid takes place.

By the method according to the invention one does not need any additional auxiliary tools like e.g. conveyor bands, in order to transport the deep-drawn sheet material sections of which the grids according to the invention are made, from one processing station to the other ones. This will cut down the mounting time considerably.

Since the grid areas on both sides are supported by sheet material strips, there results the additional advantage that the areas can be placed at exact position into the individual processing stations as any distorting or canting during the transport is impossible.

Finally it is suggested to provide the edge strips with recesses where a conveying means is engaging. Consequently the sheet material can be transported without having to be placed on e.g. a conveyor band, where the conveying operation itself takes place by a direct or indirect engaging of a drive in the recesses.

Further details, advantages, and characteristics of the invention will be apparent not only from the claims, the features to be learned therefrom, in itself and/or in combination, but also from the following description of preferred embodiment examples illustrated in the accompanying drawings, where

Figure 1:
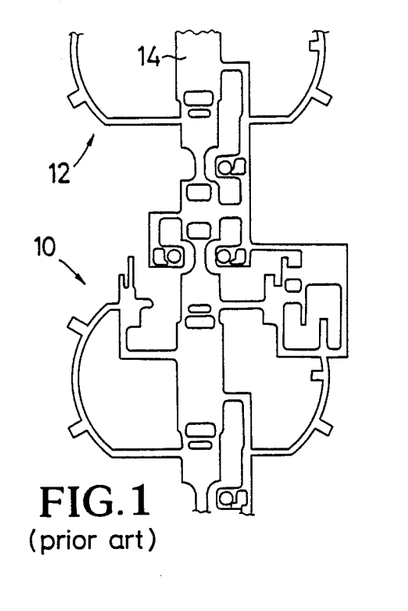
FIG. 1 shows a punched grid during the manufacturing process according to prior art.

Turning to the drawings, and more particularly to FIG. 1 there is shown a section of essentially plane punched grids (10) and (12) as known from prior art during the manufacturing process. The grids (10) and (12) are stamped out from sheet metal widths, where some areas can be bent or folded in order to provide conductor paths as required. Due to the bending or folding technique, however, the number or the density of the conductor paths is extremely limited. The individual punched grids (10) and (12) are connected with each other by a strip facilitating the transport from processing station to processing station. This strip (14) extends centrally through the punched grids (10) and (12), in order to be able to make the necessary stampings, bendings, and foldings in the exterior areas.

While transporting the punched grids (10) and (12) connected with each other by the strip (14), care must be taken to prevent these from distorting towards each other, since otherwise the subsequent largely full-automatically running machining operations could cause defects.

Figure 2:
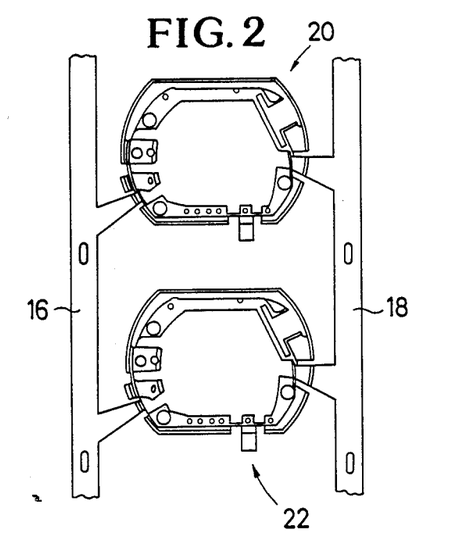
FIG. 2 shows a grid during the manufacturing process according to the invention.

In order to make available a grid for e.g. an electromotor of a tool or e.g. a sash lifter, as compared to punched grids with a greater number and/or density of conductor paths, according to the invention it is suggested to construct the grids as a single-step or preferably multi-step deep-drawn part. Such deep-drawn grids during a machining operation are illustrated in FIG. 2 and referenced by number (20) and (22). The grids (20) and (22) connected with each other by lateral strips (16) and (18), are likewise made of a sheet metal strip, which after having been punched, is moved through deep drawing moulds provided with one or several stamps, and subsequently is freecut or free-punched areawise in order to obtain conductor paths in different planes and courses. For facilitating the forwarding and leading to the following processing stations, the drawn grids (20), (22) are hereby supported by the marginal strips (16) and (18). By this connection via the marginal strips (16) and (18), as compared to the manner of connection according to FIG. 1, it is largely guaranteed that the grids (20) and (22) during the transport cannot be distorted towards each other or bent so that the further processing can take place without any trouble. In addition recesses are provided in the marginal strips (16) and (18) engaging the drive means for conveying the lined up and connected grids (20) and (22).

Figures 3, 6:
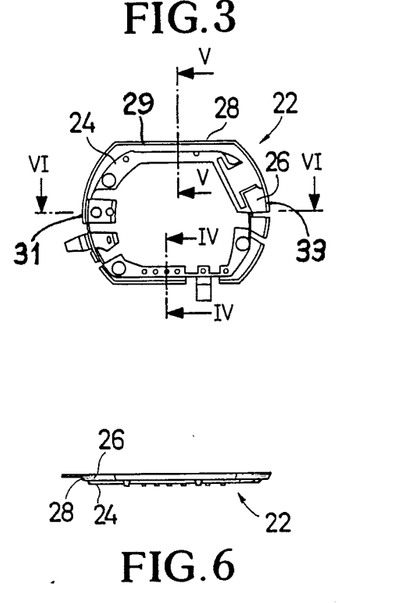
FIG. 3 is a top view on a three-dimensional grid according to the invention.
FIG. 6 shows a cross-sectional view along the line VI—VI in FIG. 3.
Figure 4:
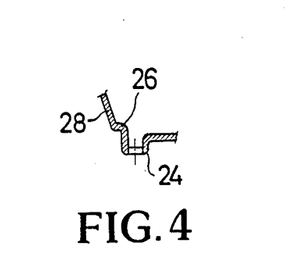
FIG. 4 is a cross-sectional view along the line IV—IV in FIG. 3
Figure 5:
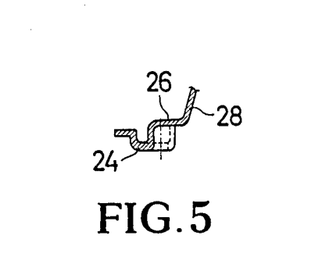
FIG. 5 shows a cross-sectional view along the line V—V in FIG. 3.

In the embodiment example according to FIG. 2, the deep-drawn grids are pot-shaped, as it shall likewise be illustrated by the detail drawings of the FIGS. 3 to 5.

Thus the grid (22) is composed of a floor space (24), parallel to which a step (26) is running being followed by a conically enlarging outer wall (28).

Consequently the grid (22) is of multi-step design by the base or floor space (24), the step (26) and the walls following the step, which especially after the mounting in a girder (see e.g. FIG. 13 and FIG. 16), and cutting through individual areas, are subdivided into a plurality of electric conductor paths separated from each other. At the same time, the conductor paths can extend not only in the individual planes running parallelly to each other, but also vertically to such planes. In this manner one obtains a high density of conductor paths on the most narrow space, which enable a complete connection system of the electromotor with e.g. radio shielding means or other electric switchings, like e.g. a speed control.

Thus a current path (29) can run from point (31) to point (33). Consequently the current path (29) is curved and extends in a plane angled off with respect to a base area (24). This can be achieved by deep-drawing without resulting in folds of the base area (24). With a punched grid being bent areawise, however, the course of a conductor path like the path (29) would be impossible.

The multi-step, or pot or cup-shaped design of the grid (22) is also illustrated especially by the section drawing of the FIGS. 4, 5, and 6.

Figure 7:
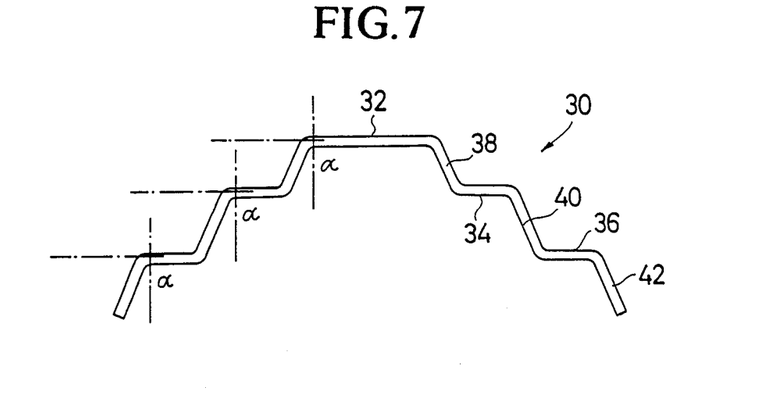
FIG. 7 is a sectional view of another embodiment of a grid according to the invention.
Figure 8:
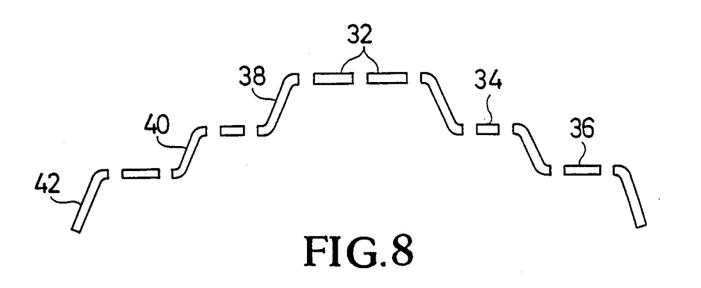
FIG. 8 shows the grid according to FIG. 7, with conductor paths obtained by cutting.

By means of the FIGS. 7 and 8 it shall be illustrated that the deep-drawn grids, as to the steps, can likewise be of higher grade design. The grid (30) shown in FIG. 7 presents a total of three steps, being defined by the bottom face (32) and two planes (34) and (36) running parallelly hereto. Between the individual steps (32), (34), and (36) they are likewise extending outwards, thus defining circumferential walls (38), (40), and (42) enlarging away from the bottom area (32), which can follow a curved course. At the same time the walls (38), (40), and (42) are describing preferably an angle α of 70° to 80°, preferably of 75°, to the respective intermediate step. By means of a respective geometry, the planes or steps can be divided up by a simple cutting into conductor paths separated from each other, as illustrated in FIG. 8.

It is obvious that a plurality of conductor paths separated from each other can be made available e.g. by separating the steps (36) and (38) or the base area (32) from the adjacent diagonally extending walls (38), (40), and (42). At the same time the base area (32) can still be subdivided into two separate areas.

On principle, the cutting is done only after the grid (30) has been mounted in a support or spray-coated with a support material, since otherwise the areas to be separated would fall apart. The separating can be done in such a manner that conductor paths are made available running parallelly to the bottom area (32) as well as axially, so that a plurality of connecting systems is possible.

Thus by the design of the pot-shaped drawn grids one can easily bridge-span differences of level up to 30 mm, whereby the multiple modes of application are obvious.

Grids manufactured according to the invention, however, must not necessarily be pot or cup-shaped, rather any desired geometry can be realized subject to the shape of the stamps or the draw-mould. So in FIG. 9, as an example, an arch-shaped draw-grid (44) is illustrated in top view, that can be U-shaped in the area of the section XI—XI, and in the area of the legs (46) shows a kind of corrugated paper structure. In this manner one obtains a high density of conductor paths, where in the area of section XI—XI e.g. three conductor paths can be made available due to the fact that the U-shaped drawn grid, in the area of its bottom face (48) is separated by the adjacent walls (50) and (52).

Figures 9, 10, 11:
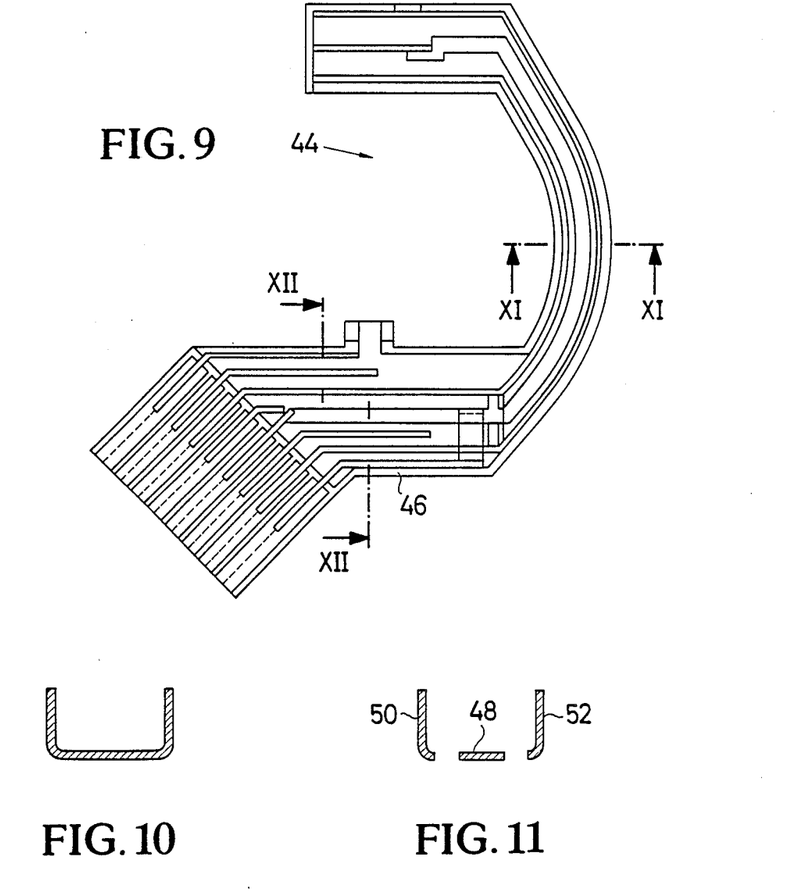
FIG. 9 is a top view on still another embodiment of a grid according to the invention.
FIG. 10 illustrates on principle a section along the line XI—XI in FIG. 9 without separated areas.
FIG. 11 is an illustration according to FIG. 10, however with separated conductor paths.

Consequently, after the drawing process, a closed U is found according to FIG. 10, which basically is a single conductor path. After the separating operation, however, there is a total of three conductor paths (48), (50), and (52) available.

Figure 12:
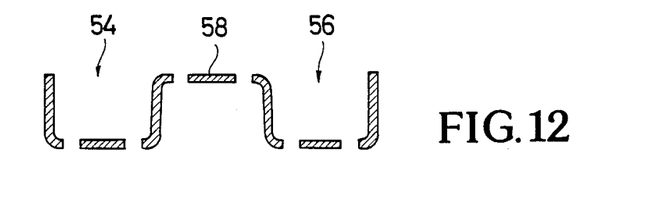
FIG. 12 is a principle illustration of a section within the area XII of FIG. 9.

Within the range of the leg (56) one can still obtain an even greater number of conductor paths, by designing the leg (46) as a kind of a corrugated paper structure, composed of two U-shaped sections (54) and (56) arranged in same direction and connected via a bridge (58). According to the graphic illustration, the bottom areas can then be separated from the walls in order to provide a total of eight separate conductor paths according to the embodiment example, which paths can be connected with a contact plug.

Figure 13:
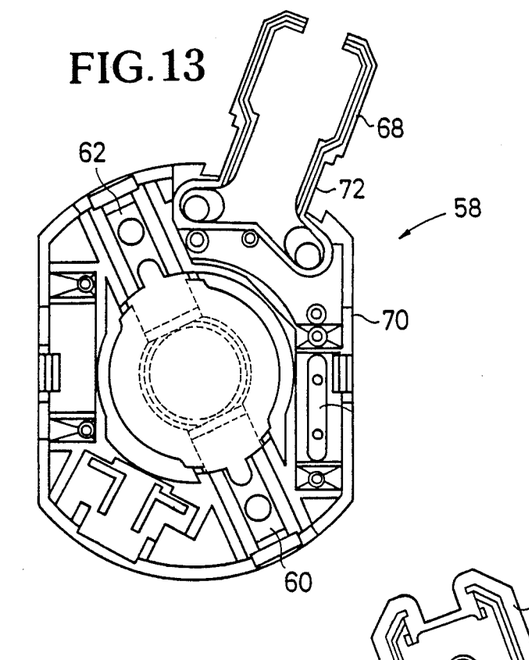
FIG. 13 is a front view of a support lodging a grid according to the invention.
Figure 14:
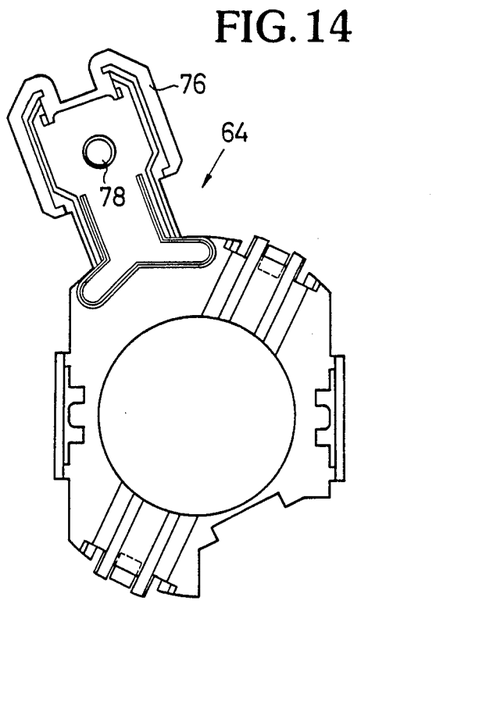
FIG. 14 is a back view of a cover sealing the support according to FIG. 13.
Figure 15:
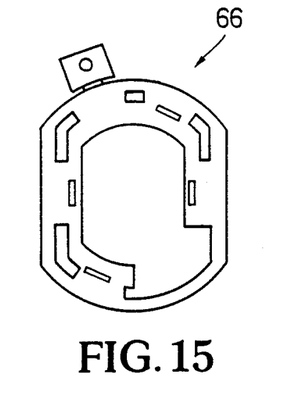
FIG. 15 shows a packing sealing the cover.
Figure 16:
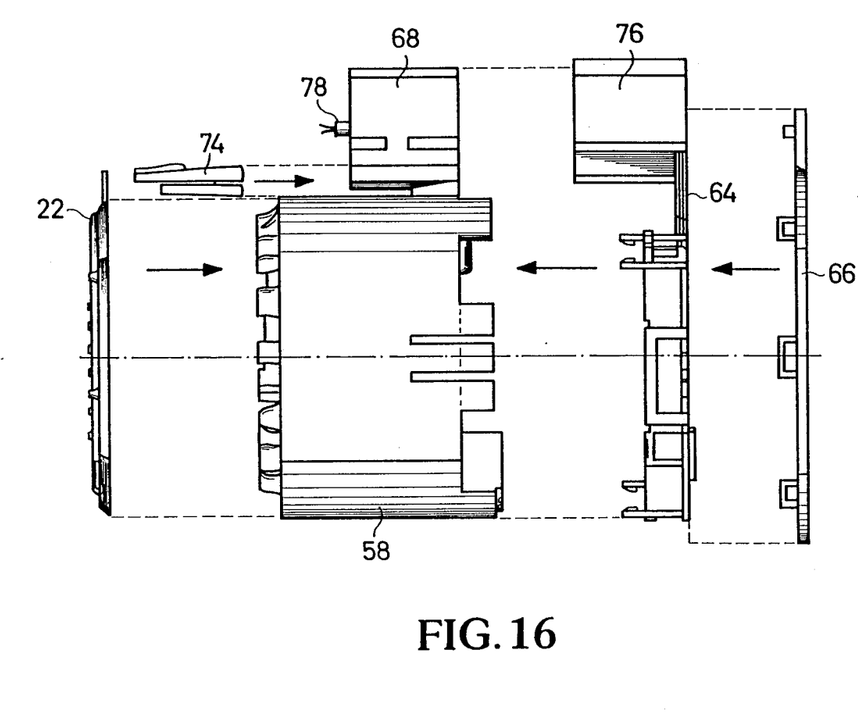
FIG. 16 is an enlarged view of the support with cover, seal and grid according to FIGS. 3, 13, 14, and 15.

Drawn grids according to the invention, like e.g. the drawn grids (20) and (22) according to FIGS. 2 to 6, can be arranged in a support (58) as illustrated in the FIGS. 13 and 16. Such a support (58) can be arranged e.g. in a motor casing of a permanent magnet-excited commutator motor, and for this purpose has receptacles (60) and (62) limited by bridges for carbon brushes interacting with the commutator. On the outside the girder (58) can be locked with a cover (64), which on its part is areawise covered by a seal (66), being arranged hermetically between the motor casing and another casing following immediately in axial direction of the motor, like e.g. the gear box of an electrically driven automobile window lift. The support (58) has a radially projecting lug (68), through which electric lines for power supply and connection of electric and electronic elements lodged in the support (58) are conducted. The lug (68) has a tapering (72) adjacent to the support housing (70) being partially surrounded by a seal (74), the seal of which on its part is packing opposite a housing taking in the support (58), like a motor casing, within the range of the duct (68). The cover (64) has a lug (76) receiving the lug (68), and being closed except for an opening (78) on the outside. Through the opening (78) a sealing compound, like silicon, can be injected into the chamber surrounded by the lugs (68) and (76). In the area of the inlets of the conductors (78) a clamp-type sealing is provided, which on the one hand guarantees a fixing of position of the electric wires (78), and on the other hand prevents the sealing compound from penetrating the bottom surface.

The assembly of girder (58), drawn grid (22), cover (64), and packings (66) and (74) is illustrated in FIG. 16.

Consequently, for assembling the girder (58) must be equipped with the cover (64) as well as with the packings (74) and (66). According to still another suggestion of the invention this time-consuming assembling can be simplified in that the cover (64) with the flat seal (66), and the support body (58) with the duct (68) and the seal (74) each are produced in a two-component injection moulding, so that the mentioned four parts can be reduced to two.

This two component method can be a hard/soft/hard injection moulding. The parts produced by this method will facilitate the mounting and in addition guarantee that especially the seals are coordinated in exact position with the cover (66) or the duct (68).

Of course it is not necessary to provide the support body (68) and the cover (64) with the lugs (68) and (76). Rather the electric lead wires can run completely within the seal (66) to which wires pressure is admitted by parts of the casing from both sides (not shown). Inside the seal (66) the connection cables are preferably insulated and tinned.

According to the invention, the drawn grids offer the chance of making available a high density and number of conductor paths. According to a further suggestion of the invention it is now arranged that the sequence of contacting of the conductor paths must not be set up in the order of a predetermined standard plug arrangement. Rather the imprinted norm can be cancelled by some kind of an adapter, in order to be able to coordinate conductor paths with sequences differing from each other with one and the same plug in accordance with the requirements and ranges of application. At the same time, the plug casing can be injection-moulded onto the plastics part carrying the conductor paths, so that the respective plugs can be fully automatically coordinated with the drawn grid to a far-reaching extent.

Figure 17:
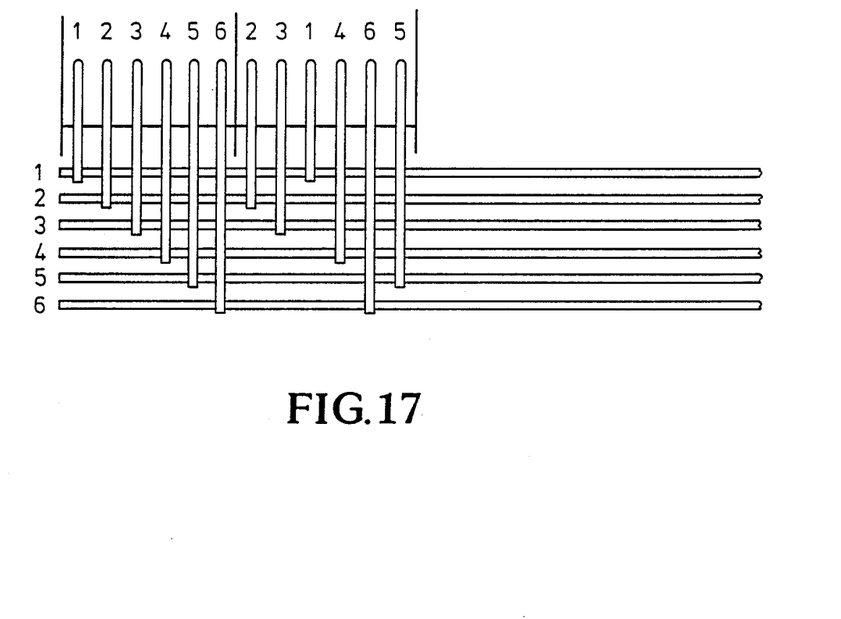
FIG. 17 is a principle illustration of contacting a grid.

As illustrated in FIG. 17, conductor paths (1) to (6) in different order can be provided with plug connections (1) to (6) without having to change the plug itself.

Hereby the connecting between the plug arrangement and the conductor paths themselves can be widely extended, so that in spite of small distances of the conductor paths, there will be still the necessary safety distances in the area of the plugs.

This suggestion, which of course is not limited in application to drawn grids according to the invention only, is further offering the chance that the plugs can leave the respective apparatus in almost any angle position to the mounted grid.

I claim:

1. A grid (22, 30) made of electrically conducting sheet metal for the connection of especially an electromotor such as an electric tool or a sash lifter, with areas electrically separated from each other forming conductor paths, which can extend in different planes, characterized in that the grid (22, 30) is an at least single-stage, deep-drawn part enabling substantially unrestricted defining of the conductor paths.

2. A grid according to claim 1, characterized in that the grid (22, 30) is preferably formed like a cup or a pot or a semi-circular dish, and that the areas defining the conductor paths (24, 26, 28, 32, 34, 36, 38, 40, 42) are preferably cut free.

3. A grid according to claim 1, characterized in that the deep-drawn part forms a wall or walls, or their sections (28, 38, 40, 42), in respect to a base area (24, 32) of the grid (22, 30) describing an angle $\alpha$ of $70° \leq \alpha \leq 80°$, preferably $\alpha = 75°$.

4. A grid according to claim 1, characterized in that the conductor paths after arranging the grid in a receptacle, in the form of a support (14), are defined by removed sheet material.

5. A grid according to claim 1, characterized in that conductor paths (29) are extending in a plane (28) at an angle to the grid (22), and are following, at least areawise, the course of one or several curves.

6. A grid according to claim 1, characterized in that the grid (22, 30) has, at least, one lug in the form of a step (26, 34, 36).

7. A grid according to claim 6, characterized in that the grid has several lugs (34, 36) in the form of a step, being arranged in the same planes or in planes parallel to each other.

8. A grid according to claim 7 characterized in that the grid has wall sections adjacent the step-shaped lugs, (26, 34, 36) and wherein the step-shaped lugs are electrically separated from the adjacent wall sections (28, 38, 40, 42) of the grid (22, 30).

9. A method for producing a grid of electrically conducting sheet material for the connection of especially an electromotor such as an electric tool or a sash lifter, with areas forming conductor paths electrically separated from each other, which can extend in different planes, characterized in that sections of the sheet material are successively, at least, single-stage deep drawn and subsequently are cut free areawise for obtaining the conductor paths, where the sections are connected via, at least, one marginal area of the sheet material forming a lateral strip.

10. A method according to claim 9, characterized in that the sections by means of two outside lateral strips are continuously connected, through which the transport during the processing operation for the fabrication of the almost finished grids takes place.

11. A method according to claim 10, characterized in that the lateral strip is provided with recesses, which will be engaged by a conveying element.

* * * * *